Figure 1:
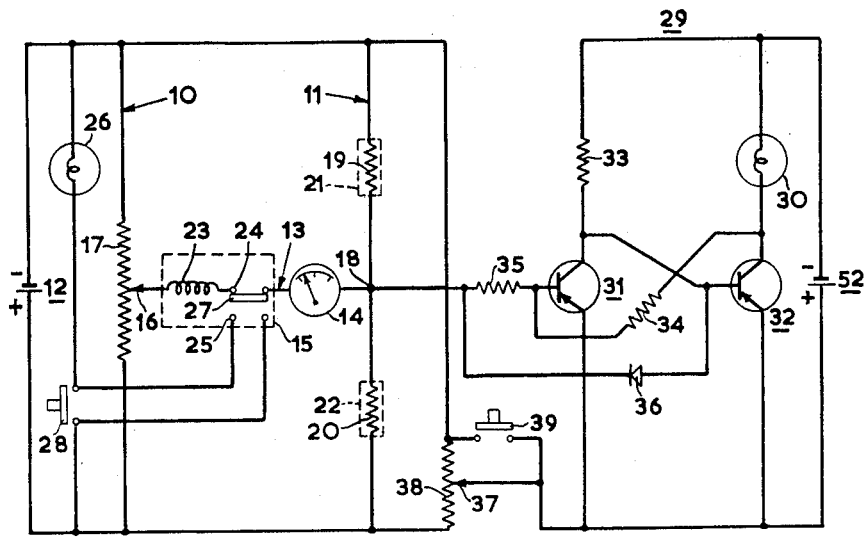

Feb. 1, 1966  T. H. PALMER  3,233,233
GAS DETECTING APPARATUS
Filed Nov. 30, 1961

Inventor
Thomas Henry Palmer
By Stevens, Davis, Miller & Mosher
Attorneys

United States Patent Office 3,233,233
Patented Feb. 1, 1966

3,233,233
GAS DETECTING APPARATUS
Thomas Henry Palmer, Stafford, England, assignor to The English Electric Company Limited, London, England, a British company
Filed Nov. 30, 1961, Ser. No. 156,011
Claims priority, application Great Britain, Dec. 15, 1960, 43,186/60
2 Claims. (Cl. 340—237)

This invention relates to an apparatus for detecting the presence of small quantities of a combustible gas in an atmosphere.

According to the present invention such an apparatus includes, in combination, an electric detecting means responsive to the presence of the combustible gas for producing an electric potential dependent upon the amount of the said gas present in the atmosphere, an electric amplifying means responsive to the said electric potential, and a gas warning means connected for energisation by the amplifying means, the latter being arranged to produce an electric output sufficient to cause operation of the warning means only when the output potential of the detecting means rises above a predetermined value.

According to one preferred feature of the present invention the apparatus also includes an inhibiting means responsive to the electric potential produced by the gas detecting means for rendering the amplifying means ineffective to cause operation of the gas warning means when the said output potential exceeds a predetermined high value which is indicative of the existence of an abnormal working condition in the gas detecting means.

The amplifying means may include an output circuit for controlling the energisation of the gas warning means, an input circuit responsive to the output potential of the gas detecting means for controlling the energisation of the said ouptut circuit, each of the said circuits including a controllable impedance device, and means for interconnecting the control and output elements of the two controllable impedance devices so as to cause the said output circuit of the amplifying means to cause rapid operation of the gas warning means when the energisation of the said input circuit reaches a predetermined value; and in such a case the said inhibiting means may comprise an electric circuit inter-connecting the control and output elements of the variable impedance device of the said input circuit and including a semi-conductor diode for preventing the flow of current through this circuit from the output element to the control element except when the output potential of the gas detecting means rises above the predetermined high value which is indicative of the existence of an abnormal working condition in the gas detecting means.

The controllable impedance devices may comprise transistors.

According to another preferred feature of the present invention the apparatus may also include means for automatically operating a second electric warning means whenever the said output potential of the gas detecting means exceeds a predetermined high value indicative of the existence of an abnormal working condition in the gas detecting means. Furthermore means may be provided for applying temporarily as desired a potential to the second warning means sufficient to operate the second warning means regardless of the condition of the gas detecting means.

According to another preferred feature of the present invention the gas detecting means may comprise an electric bridge circuit arrangement which includes in one limb thereof a resistive element whose resistance value is increased by a catalytically-induced combustion of the said combustible gas on or in close proximity to the resistive element, the output potential of the gas detecting means being dependent on the potential developed across this resistive circuit.

In the latter case the said inhibiting means may comprise a semi-conductor diode connected in parallel with the said resistive element in a sense such as to carry substantially no current when the resistive element is in good working condition but to limit the potential developed across the resistive element, in the event of an open circuit occurring in the resistive element, to a value which is insufficient to cause the amplifying means to operate the gas warning means.

Figure 2:
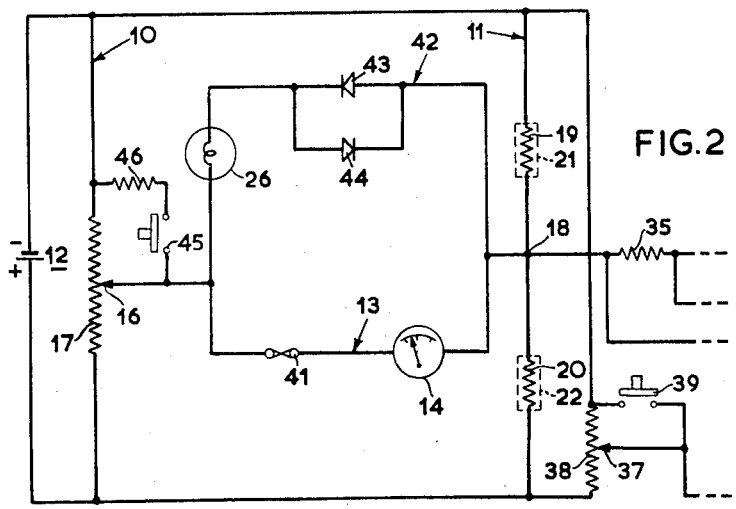

One gas detector according to the present invention for detecting the presence of methane in an atmosphere in a mine working, or in a sample of the said atmosphere, will now be described by way of example with reference to the accompanying drawing. FIG. 1 shows diagrammatically the electrical circuit connections of the detector, whilst FIG. 2 shows a modification of the circuit shown in FIG. 1.

Referring now to the drawing the gas detector includes an electrical bridge circuit of the Wheatstone type in which two parallel-connected circuits 10, 11 are supplied from a battery 12, and in which a detection circuit 13 which includes in series a meter 14 and an automatic cut-out 15 is connected between an adjustable tapping 16 on a resistor 17 connected in the circuit 10 and the junction 18 of two resistors 19, 20 connected in series with one another in the circuit 11.

The resistors 19, 20 are constructed of platinum wire and have the same resistance values at any given temperature. These resistors are mounted within porous ceramic enclosures 21, 22 into which gases present in the atmosphere surrounding the enclosures may diffuse. The resistor 19 is constructed of a platinum wire which has been treated or activated so as to cause methane when in contact therewith to burn on the surface of the resistor as a result of a catalytic action and thereby raise its temperature and hence resistance. On the other hand, the resistor 20 is made of a platinum wire which has not been subjected to such treatment so that methane in contact with the resistor 20 produces no heating and consequent rise in the resistance of the resistor 20.

The adjustable tapping 16 on the resistor 17 is adjusted so that when the atmosphere in contact with the resistors 19 and 20 is free of methane the potential of the tapping 16 is equal to that of the junction 18 so that the bridge circuit is balanced and no current flows through the meter 14; the latter consequently indicates zero percentage of methane in the atmosphere diffusing through the enclosures 21, 22.

The cut-out 15 has a tripping coil 23 and one pair of contacts 24 connected in series in the detection circuit 13, and another pair of contacts 25 connected in series with a bridge circuit failure warning lamp 26. A movable contact bridge 27 of the cut-out is held latched under normal operating conditions in a position in which the contacts 24 are bridged so as to complete the detection circuit 13. However, under conditions of excessive current flow in the detection circuit, such as will arise in the event of an open circuit in the circuits 10 or 11, the tripping coil operates to trip the latch holding the contact bridge and the latter thereupon moves to bridge the contacts 25 and thereby illuminate the bridge circuit failure warning lamp. This cut-out is intended to safeguard particularly against the occurrence of an open circuit in the platinum resistors 19 and 20. A normally-open push button switch 28 operable by the user gas detector is provided for testing the condition of the bridge circuit failure indication lamp and its associated circuit, depression of this switch being effective to short-circuit the contacts 25.

Further details concerning the construction of the resistors 19 and 20 and their enclosures 21 and 22 are included in United States patent application Serial No. 85,638, filed on January 30, 1961, applicant Thomas Henry Palmer.

In operation the temperature and hence resistance value of the resistor 19 increases with increase in the percentage of methane present in the atmosphere which diffuses through the enclosures 21, 22 so that the potential of the junction 18 rises relative to that of the tapping 16. The consequently increased current flow through the detection circuit 13 is indicated on the meter 14.

In order to give a visible indication when the percentage methane content of the atmosphere rises above a predetermined high or dangerous value, the potential of the junction 18 is applied to an "ON/OFF" type amplifier generally indicated at 29, which operates to illuminate a gas warning lamp 30 when the potential of the junction 18 has risen to a corresponding predetermined high value. The amplifier includes two transistors 31, 32 having their respective emitter-collector circuits connected in parallel across a battery 52, the transistors 31 having as a collector circuit load a resistor 33, and the transistor 32 having as its collector circuit load the gas warning lamp 30.

The base of the transistor 32 is inter-connected with the collector of the transistor 31, whilst the base of the transistor 31 is inter-connected through a resistor 34 with the collector of the transistor 32. The base of the transistor 31 is also connected through a resistor 35 to the junction 18 of the bridge circuit and through a diode 36 to the base of the transistor 32.

The emitters of the transistors 31, 32 are also connected with an adjustable tapping 37 of a potentiometer 38 connected in parallel with the bridge circuit so as to provide a positive reference potential for the emitters of the transistors 31 and 32.

A push button switch 39 is provided for testing the operation of the amplifier and gas warning lamp, closure of this switch being effective to apply a high positive base-emitter potential to the transistor 31 whereby to cause the amplifier illuminate the gas warning lamp.

In operation the adjustable tapping 37 on the potentiometer 38 is set to a position in which with no methane present in the atmosphere and the bridge circuit consequently balanced, the potential of the base of the transistor 31 is negative relative to that of the emitter of that transistor. The latter consequenly conducts so that the potential of the base of the transistor 32 is held near to that of the emitter of that transistor 32. The latter is consequently non-conducting so that the gas warning lamp is extinguished. The consequent highly negative potential applied to the collector of the transistor 32 assists in maintaining the potential of the base of the transistor 31 at a value negative relative to that of the emitter of that transistor 31.

The setting of the adjustable tapping 37 is also such that the potential applied to the base of the transistor 31 by the junction 18 remains sufficiently negative relative to that of the emitter of the transistor 31 as to maintain the transistor 32 non-conducting until the percentage of methane present in the atmosphere reaches the aforesaid high or dangerous value, whereupon the transistor 31 becomes non-conducting. The consequent rise in the negative potential of the base of the emitter 32 causes the latter to conduct and illuminate the gas warning lamp.

Since the base of the transistor 31 is connected with the collector of the transistor 32 the rise in potential of the collector of the transistor 32 as the collector current of the transistor 31 starts to decrease on reaching the danger value of methane content accelerates the rise of the collector current of the transistor 32, which in turn accelerates the fall in the collector current of the transistor 31. Furthermore the resistive inter-connection of the base of the transistor 31 and the collector of the transistor 32 acts to maintain the transistor 31 non-conducting and the transistor 32 conducting until the methane content of the atmosphere has subsequently fallen below the aforesaid danger value. In this way the amplifier behaves in effect as a switch switching the gas warning lamp on and off as the methane content of the atmosphere varies about the danger value.

A small differential exists between the methane content at which the gas warning lamp becomes illuminated and that at which the lamp subsequently becomes extinguished on decrease of the methane content. The magnitude of this differential may be varied by varying the resistance value of the resistor 34.

The depression of the amplifier testing push button 39 results in the application of a high positive potential to the base of the transistor 31 thus causing the collector current flowing through the resistor 33 to be suppressed. The consequent rise in the negative potential of the collector of the transistor 31 causes the transistor 32 to conduct and illuminate the gas warning lamp. A failure to respond in this manner on the depression of the test push button 39 indicates the presence of a fault in the gas warning lamp 30 or in the amplifier 29.

It is highly desirable that in the event of a failure of any of the bridge circuit resistors, the amplifier should not be caused to illuminate the gas warning lamp. There is no danger of this happening when a bridge circuit failure results merely in an increase of the negative potential applied by the junction 18 to the base of the transistor 31. On the other hand it is essential that if a bridge circuit failure should result in a tendency to render the base of the transistor 31 positive relative to its emitter this tendency should be automatically resisted. This is effected by the diode 36 which when a high positive potential is developed at the junction 18 (such as is produced by the failure of the resistor 19 and the consequent operation of the cut-out 15 to prevent excessive current flow through the meter) conducts current in its reverse sense so as to maintain the potential of the base of the transistor 32 at a value sufficient to prevent conduction in the transistor 32 and hence to prevent illumination of the gas warning lamp.

FIG. 2 shows a modification of the bridge circuit failure warning means, the amplifier 29 being unaltered in this modification so that it is not shown in FIG. 2.

The cut-out 15 of FIG. 1 is omitted in this modification and in its place is substituted a meter-protecting fuse 41. A bridge circuit failure warning circuit 42 is connected in parallel with the detection circuit 13 and the circuit 42 includes in series the bridge circuit failure warning lamp 26 and a pair of diodes 43, 44, the latter being connected in parallel with one another and in a manner such as to conduct current in opposite senses.

Under normal operating conditions of the bridge circuit the potential applied across the diodes 43, 44, is insufficient to cause them to conduct. Hence the warning lamp is not illuminated. However, in the event of an open circuit developing in one of the resistors 19 or 20 the greatly increased potential applied across the diodes 43, 44 is such as to cause one of them to conduct in its forward sense and thereby illuminate the warning lamp 26. The diode now conducting effectively by-passes the detection circuit 13, and prevents the flow of excessive current through the meter 14.

In order to test the warning lamp 26 and its associated warning circuit a push button test switch 45 is arranged on depression thereof to connect the detection circuit with the negative terminal of the battery 12, a limiting resistor 46 being connected in circuit with the push button switch whereby to limit the current flowing through the meter 14 to a value not greatly exceeding that required to produce full-scale deflection of the meter.

What I claim as my invention and desire to secure by Letters Patent is:

1. Apparatus for detecting the presence of small quantities of a combustible gas in an atmosphere under test including, in combination, catalytic gas detecting means for producing at an output circuit thereof an electric potential dependent on the amount of combustible gas in the atmosphere, reference means for producing at an output circuit thereof an adjustable reference potential, electric switching means comprising an input stage which includes a first transistor having emitter, base and collector, a collector load resistor connecting the collector with a source of collector potential, first circuit means connecting the emitter directly with a source of emitter potential, and second circuit means connecting the output circuits of the gas detecting means and the reference means in series between the emitter and base of the first transistor so that the difference of the two electric potentials is applied between the emitter and base, an output stage which includes a second transistor having emitter, base and collector, an electrical warning device connecting the collector of the second transistor with the said source of collector potential, third circuit means connecting the emitter of the second transistor directly with the said source of emitter potential, fourth circuit means connecting the base of the second transistor to the collector of the first transistor, and a resistor connecting the base of the first transistor with the collector of the second transistor, the warning device being normally in a non-warning state and being energised to change to a warning state only when the potential appearing at the output circuit of the gas detecting means corresponds to a predetermined high amount of combustible gas in the atmosphere as determined by the value of the adjustable reference potential, a semi-conductor diode device connecting the output circuit of the gas detecting means with the collector of the first transistor and being poled so as to enable the flow of current to the collector of the first transistor only when the potential appearing at the output circuit of the gas detecting means rises above a predetermined high value, such flow of current tending to prevent conduction of the second transistor and hence transfer of the warning device to the warning state, means for producing a second reference electric potential equal to the potential appearing at the said output circut of the gas detecting means when no combustible gas is present in the atmosphere under test, and fault indicating means connected to receive the second reference potential and the potential appearing at the said output circuit and arranged to change from a non-warning state to a warning state when the output potential of the gas detecting means exceeds the second reference potential by a predetermined high value whereby to indicate the presence of a fault in the gas detecting means.

2. Apparatus according to claim 1, including in series relationship with the fault indicating means a pair of parallel-connected opposed diodes for delaying the growth of current through the fault indicating means until the difference in the two potentials is large.

References Cited by the Examiner

UNITED STATES PATENTS

| | | | |
|---|---|---|---|
| 2,535,133 | 12/1950 | Hoch | 340—233 XR |
| 2,828,450 | 3/1958 | Pinckaers. | |
| 2,879,663 | 3/1959 | Thomas | 23—255 XR |
| 2,917,731 | 12/1959 | Rodgers | 340—213 |
| 2,945,133 | 7/1960 | Pinckaers | 317—148.5 XR |
| 2,960,657 | 11/1960 | Edgerly | 340—248 XR |
| 3,041,477 | 6/1962 | Budts et al. | 307—88.5 |

FOREIGN PATENTS

| | | |
|---|---|---|
| 647,724 | 7/1937 | Germany. |
| 802,307 | 10/1958 | Great Britain. |

NEIL C. READ, *Primary Examiner.*